United States Patent Office 3,583,031
Patented June 8, 1971

3,583,031
APPARATUS FOR BLOW MOLDING HOLLOW THERMOPLASTIC BODIES
Rainer Holzmann, Roleber, Reiner Kader, Holzlar, and Alfred Thomas, Dambroich, Germany, assignors to Kautex-Werk Reinold Hagen, Hangelar uber Siegburg, Rhineland, Germany
Filed Apr. 28, 1969, Ser. No. 819,724
Claims priority, application Germany, Apr. 26, 1968, P 17 78 404.2; Oct. 14, 1968, P 18 02 915.7, P 18 02 916.8; Dec. 7, 1968, P 18 13 367.0; Dec. 10, 1968, P 18 13 618.0
Int. Cl. B29d 23/03
U.S. Cl. 18—5
24 Claims

ABSTRACT OF THE DISCLOSURE

In an apparatus for blow molding hollow articles there is provided a receiving station where parisons are prepared, a removing station where the blow molded articles are released from the mold and a depositing station where the articles are placed for transportation or treatment. A mold is movable between the receiving and the removing station and a gripper is movable between the removing and the depositing station. When the mold takes a parison in the receiving station, the gripper grasps a blow molded article in the removing station previously left there by the mold. When the mold opens and releases an article in the removing station, the gripper releases the previously grasped article in the depositing station.

BACKGROUND, OBJECTS AND SUMMARY OF THE INVENTION

This invention relates to a method of and an apparatus for blow molding hollow articles, such as bottles, capsules or tubes from thermoplastic material. Conventionally, such apparatus includes a two or multi-part hollow blow mold which is adapted to be move backwards and forwards between a receiving station where it accepts a tubular parison from the nozzle of an extruder and a removing station where the hollow blow molded body is released from the mold. The apparatus further includes means—such as a blowing mandrel—to admit pressure into the mold for expanding the parison and thus forming said blow molded body.

It is an object of the invention to provide an improved method of the above type and an apparatus for practicing said method, wherein the blow molded hollow articles are transmitted from said apparatus to a subsequent conveying or treating device in an orderly sequence.

It is a further object of the invention to provide an improved apparatus of the aforenoted type, wherein the blow molded hollow articles may dwell at the removing station after their release from the mold.

It is still another object of the invention to provide an improved apparatus of the aforenoted type wherein an unobstructed motion of operating parts is ensured despite the presence of the blow molded articles in the removing station after the open mold has already been moved away.

Briefly stated, in an apparatus having a receiving station where parisons are prepared, a removing station where the blow molded articles are taken out of the mold and a depositing station from which the articles may be transported away or in which they may be subjected to a desired treatment, according to the invention there is provided an opening and closing blow mold displaceable back and forth between said receiving station and said removing station, a gripper device opening and closing substantially in unison with said mold and displaceable back and forth between said removing station and said depositing station, said gripper device is in the removing station grasping a blow molded article disposed therein while said mold is in the receiving station accepting a new parison, said gripping device is in said depositing station releasing said article while said mold is in the removing station releasing an article blow molded from said new parison.

Also, according to the invention, the holding means for the mold and the gripper device on the one hand, or the removing station on the other hand, are designed in such a manner that the blow molded article left at the removing station to be subsequently picked up by the gripper device, and the parison suspended from the receiving station to be subsequently positioned in the mold, do not interfere with the motion of any operating part.

The invention will be better understood and further objects as well as advantages will become more apparent from the ensuring detailed specification of several exemplary embodiments taken in conjunction with the schematic drawing.

DESCRIPTION OF THE EMBODIMENTS

In the different embodiments now to be described, parts having substantially the same function are assigned reference numerals having identical last two digits.

Figures 1, 3:
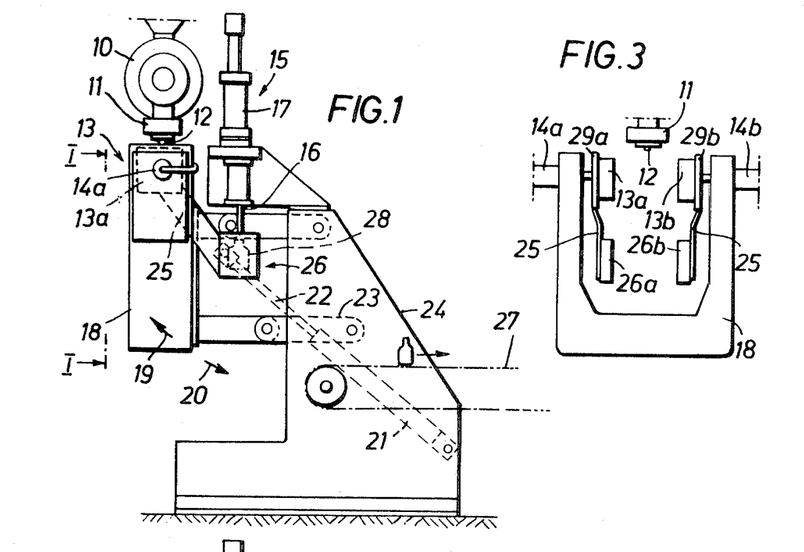
FIG. 1 is a slide elevational view of one embodiment of the invention.
FIG. 3 is a front elevational view of the support element for the mold parts taken along line I—I of FIG. 1.
Figure 2:
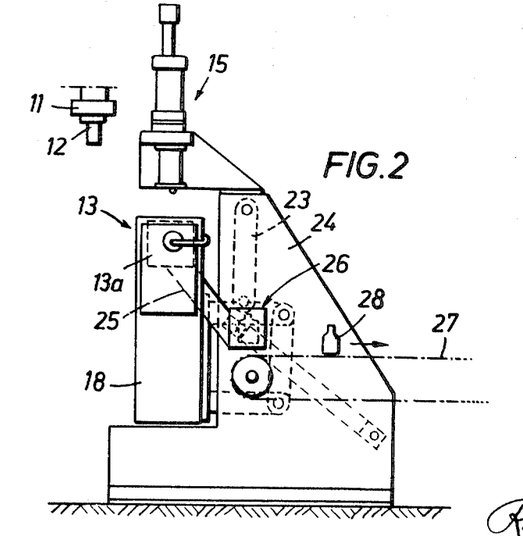
FIG. 2 is a view corresponding to FIG. 1, showing the embodiment in a different operating position.

The embodiment shown in FIGS. 1 to 3 includes an extruder 10 which is provided with an extrusion head 11 having a downwardly directed annular extrusion nozzle, from which the tubular parisons 12 are extruded. These parisons are received in sections by a hollow mold 13, comprising two halves 13a, 13b which are carried by plate-like supports 29a, 29b and which are movable relatively to one another. The mold halves are driven by means of hydraulic cylinders 14a, 14b, which are arranged on an upwardly open, U-shaped support element 18, which absorbs the forces resulting from the blowing pressure during the expanding of the parisons 12.

Situated laterally alongside the extrusion head 11 is a station 15, where the parisons are expanded in the hollow mold 13 and the obtained hollow bodies 28 are removed therefrom. The station 15 comprises essentially a blowing and gauging mandrel 16, which can be moved up and down by a cylinder 17. Thus, it is seen that the mold 13 and mandrel 16 are arranged independently of one another.

The mold 13 is arranged to be displaceable backwards and forwards between a first position below the extrusion head 11 (receiving station) and a second position at the station 15 (removing station). For this purpose, the support element 18 is connected by pivoting links 23 to a machine frame 24, and executes, with the mold 13, a swinging movement between the extrusion head 11 and station 15, as indicated by the arrows 19 and 20 in FIG. 1. This swinging movement is caused by a cylinder 21, the piston rod 22 of which is connected with a projection of the support element 18.

Secured to the mold halves 13a, 13b, or to the support members 29a, 29b, are arms 25 which carry at their ends remote from the mold 13, grippers 26a, 26b forming together a gripper device 26. The grippers 26a, 26b, which are operated in the opening and closing direction in synchronism with the two mold halves 13a, 13b, may be constructed as a supporting and cooling mold. In addition, a conveying arrangement in the form of an endless conveyor belt 27 is provided.

In the first position as shown in FIG. 1, the mold 13 is situated beneath the extrusion head 11. First it is opened so that the tubular parison 12 will extend between the two mold halves 13a, 13b. The mold is then closed by operating the cylinders 14a, 14b and is swung in the direction of the arrow 20 into the second position (FIG. 2) where the station 15 is located. The blowing mandrel 16 is now forced downwardly into the mold and into the upper end of the parison disposed therein. Then, compressed air is introduced into the parison which is expanded until it bears against the wall of the mold. The hollow article 28 thus produced cools inside the mold, resulting in the solidification of the thermoplastic material. Thereafter, the mold 13 is opened by moving the two mold halves apart, while the hollow article remains suspended from the mandrel 16.

Meanwhile, the successive parison 12 is extruded from the extrusion head 11. If now the mold 13 is swung back in the direction of the arrow 19 to the extrusion head 11 for the purpose of receiving the said successive parison, the grippers 26a, 26b, by virtue of their attachment to respective mold halves 13a, 13b by means of arms 25, participate not only in the opening and closing movements of the mold 13, but also in the pivotal displacements thereof in the direction of the arrows 19 and 20, reach the station 15. By this time the two halves 26a, 26b of the gripper device 26 have been moved apart, thus, the gripper 26 is opened. If now, actuated by the cylinders 14a, 14b, the two mold halves 13a, 13b are moved towards one another until the mold 13 is closed, the gripper device 26 is also closed so that its two halves 26a, 26b are positioned around and grasp the previously produced hollow article 28 depending from the mandrel 16. The mandrel 16 may then be upwardly withdrawn by the cylinder 17 from the hollow article since the latter is now held by the gripper device 26. With the subsequent swinging displacement of the mold 13 in the direction of the arrow 20, the gripper 26 with the hollow body 28 contained therein is brought into the second position (depositing station) immediately above the conveyor belt 27 (FIG. 2). As soon as the mold 13, now disposed at the station 15, is opened, the two halves of the gripper 26 are also moved apart, so that the hollow article 28 disposed therein drops on the conveyor belt 27 and is carried away thereby. In this way, it is thus possible to transfer without any difficulty the hollow articles to the conveyor belt 27 in an orderly sequence and to advance them to a subsequent treating apparatus or the like.

As has already been stated, the U-shaped support element 18 takes up the forces which appear in the mold during the blowing of the parisons. These forces, the strength of which depends substantially on the level of the blowing pressure and the surface acted upon by said pressure, are in particular very strong, as in generally usual today, if the mold is provided with several mold cavities and thus several parisons are expanded simultaneously. In order to be able to absorb these substantial forces, the support element must be of a correspondingly robust construction, which, in turn, results in a very heavy and cumbersome structure. Furthermore, considerable energy has to be spent for the forward and backward movement of such support element with the mold between the two stations. For these reasons, it is often preferable to use transversal bars on which the mold parts may slide.

Turning now to the embodiment shown in FIGS. 4 to 6, again, there is provided an extruder 110 with an extrusion head 111 and a removing station 115, in which the hollow articles are likewise expanded. Also, a blowing mold 113 is provided, the two halves of which are movable relatively to one another perpendicularly to the plane of the drawing. It is to be noted that in FIGS. 4–6 the observer views directly the rear half 113b of the mold. Again, the mold halves may be driven by hydraulic cylinders (not shown), which act on plate-like supports 129 which carry the mold halves and which are linearly displaceable therewith.

Figure 5:
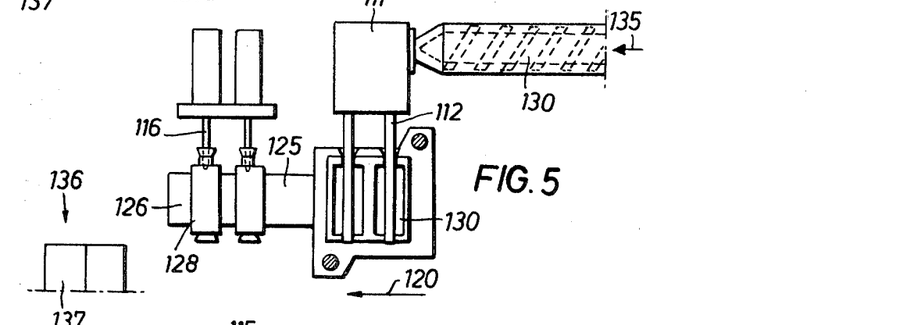
Figure 6:
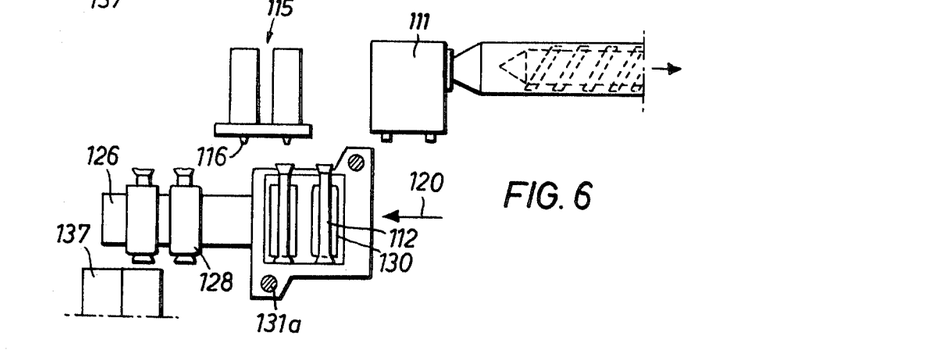

The mold carried by the supports 129 is arranged to be movable linearly in a horizontal plane backwards and forwards between the extrusion head 111 and station 115. The mold may thus be brought from its position shown in FIG. 5 in the direction of the arrow 120 into the position shown in FIG. 4, in which it is positioned at the station 115 beneath the blowing mandrels 116. From the position shown in FIG. 4, the mold 113 is adapted to be returned in the direction of the arrow 119 into the initial position according to FIG. 5. FIG. 6 shows an intermediate position of the mold between the receiving station and the removing station.

As a departure from the embodiment of FIGS. 1 to 3, parallel to the opening and closing movements of the mold halves and of the supports 129, there are disposed bars 131a, 131b serving to guide the said supports and thus the mold halves during their opening and closing movements. In addition, the function of these bars is to strut the entire assembly and to take up the forces which are present during the expansion of the parisons 112 and which tend to separate the mold halves. The presence of these bars requires certain measures in order to ensure that the hollow bodies 128, temporarily remaining in the removing station 115 after the mold is open, do not interfere with the return movement of the mold in the direction of the arrow 119 towards the extrusion head 111. The two bars 131a, 131b are arranged diagonally with respect to supports 129 in such a manner that the bar 131a which is leading during displacement in the direction towards the station 115 (i.e. in the direction of the arrow 120), is positioned lower than the bar 131b. The result of this arrangement is that, during the return movement of the mold 113 in the direction of the arrow 119, the lower bar 131a is moved past the hollow articles 128 suspended from the mandrels 116 in station 115, so that the hollow articles do not interfere with the movement of the mold and the support 118, as in the precedingly described embodiment. Consequently, it is again not necessary to remove the hollow articles 128 from the mandrels immediately after the opening of the mold 113 at the removing station 115 in order to permit the mold to perform its return movement in the direction of the arrow 119. The return movement of the mold 113 may, in fact, take place regardless of whether or not hollow articles are still in the station 115.

Figure 4:
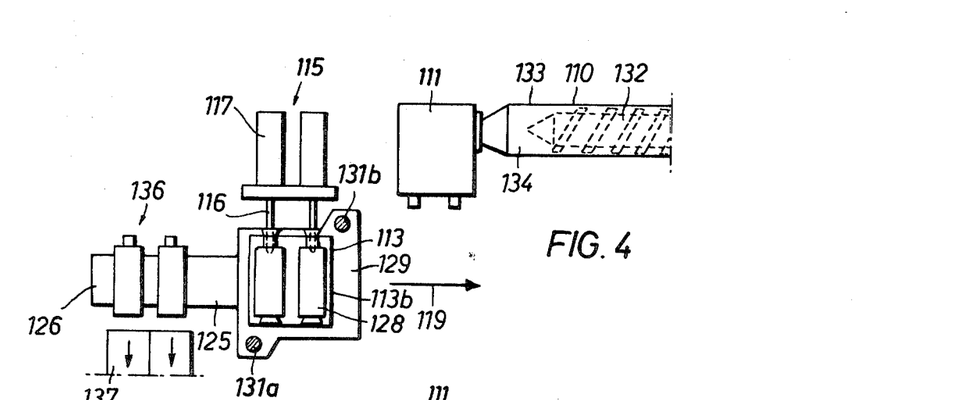
FIGS. 4 to 6 are side elevational view of three working positions of another embodiment of the invention.

Since two parisons 112 are simultaneously extruded, the mold 113 is provided with two mold compartments 130 which are arranged side-by-side. As a consequence, two hollow articles 128 are produced simultaneously in a single operation. Therefore, in the station 115 two blowing mandrels 116 are provided which are moved vertically in either direction by cylinders 117.

In addition, the embodiments according to FIGS. 4 to 6 is provided with a feed worm or screw 132 which is adapted to be moved axially backwards and forwards inside the housing 133. This construction allows the worm 132 to rotate continuously, the material being initially delivered into a storage chamber 134 immediately downstream of the free end of the worm 132. As soon as the material necessary for forming the parison has accumulated in the storage chamber 134, the screw 132 is displaced in the direction of the arrow 135 (FIG. 5) so that the material which is in the storage chamber 134 is rapidly extruded downwardly through the extrusion head 111 and the extrusion nozzles disposed therein. The extrusion of the parisons 112 thus takes place intermittently. The linear forward displacement of the screw 132 occurs approximately at that moment in which, during the return movement of the mold 113 in the direction of the arrow 119, bar 131b has passed all extrusion nozzles of the extrusion head 111. In this way, a rapid operating cycle is obtained. This procedure is based on the assumption that the extrusion of the parisons 112 only takes a short time.

After the parisons 112 have attained the required length, the mold 113 is closed and is displaced in the direction of the arrow 120 until it reaches the removing station 115. At this station, the blowing and gauging mandrels 116 are introduced downwardly into the mold thus into the parisons, whereafter the latter are expanded until they bear against the wall of the mold. After adequate cooling and solidification of the material, the mold 113 is opened, while the hollow articles 128 remain suspended from the mandrels 116. In the course of the return movement of the mold 113 in the direction of the arrow 119, a gripper 126 enters the removing station 115 (FIG. 5). As in the embodiment of FIGS. 1 to 3, this gripper device consists of two parts, each of which is connected through an arm 125 to the supports 129 carrying the mold halves. After the gripper device has reached the station 115 and has thus assumed the position shown in FIG. 5, it grasps the hollow articles 128 suspended from the mandrels 116 during the closing movement of the mold 113 which is then disposed beneath the extrusion head 111. The two mandrels 116 may then be withdrawn in an upward direction from the hollow articles so that the gripper device 126 may thereupon bring the hollow articles, by virtue of a subsequent movement in the direction of the arrow 120, to the successive depositing station 136, in which the hollow articles may be subjected to a desired treatment or handling. Indicated at 137 are tubes which receive the hollow articles after the gripper device 126 has been opened in the depositing station 136.

Figure 7:
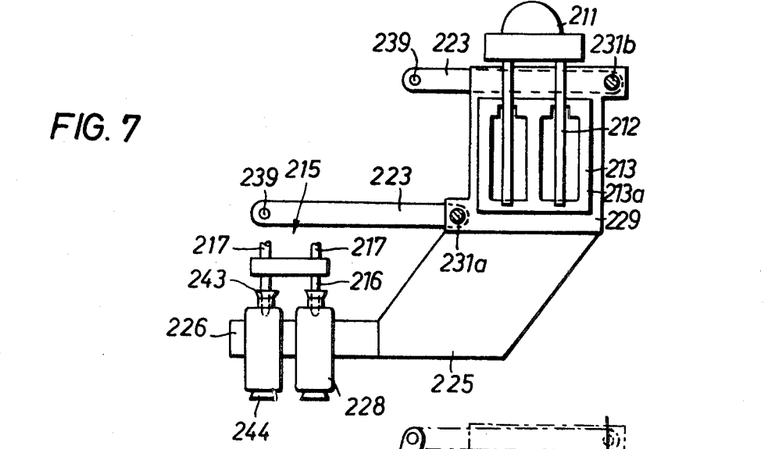
FIGS. 7 and 8 are side elevational views of two working positions of a further embodiment.
Figure 8:
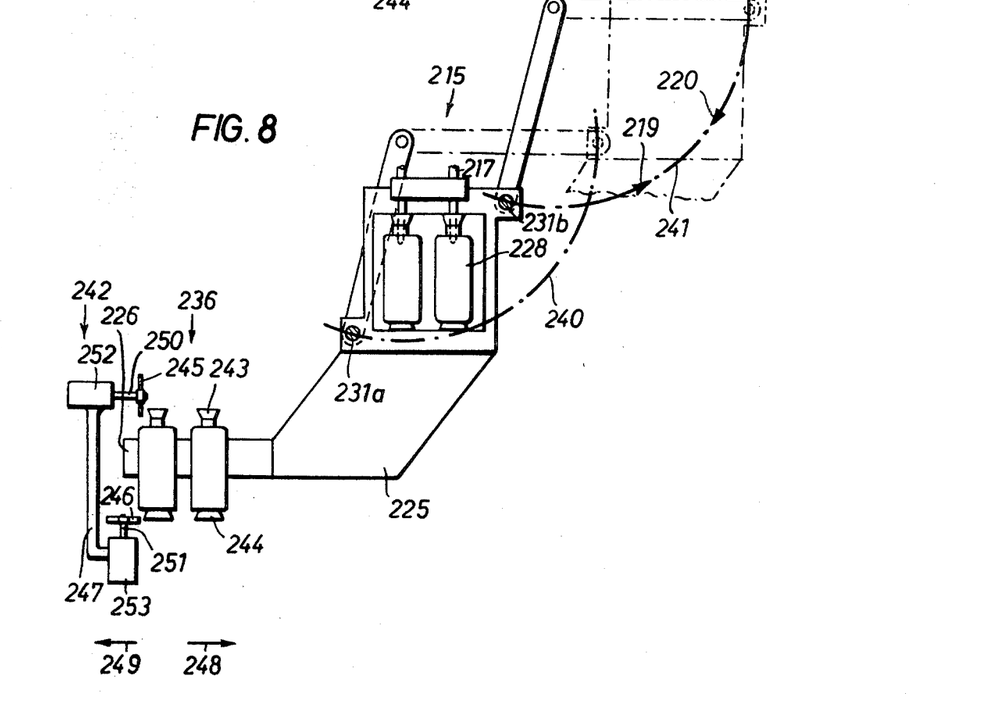

Turning now to the embodiment shown in FIGS. 7 and 8, an extrusion head 211 and a removing station 215, where the hollow bodies are expanded and then released by the mold, are again provided. The blow mold 213 is displaceable in either direction between the extrusion head 211 and the station 215 along an arcuate path by means of links 223. At one end, the links 223 are pivotally secured to a machine frame, while at the other end they are pivotally attached to bars 231a, 231b which interconnect the mold carrier supports 229 and extend parallel to the opening and closing movements of the mold halves 213a and of the supports 229. The arrangement of the two bars 231a, 231b is the same as in the embodiment according to FIGS. 4 to 6.

Furthermore, the supports 229 are provided, in a manner already described, with arms 225 which carry at their ends complemental parts forming a gripper device 226. The arrangement is such that the gripper device 226 is situated in the removing station when the mold assumes a position beneath the extrusion head 211.

The aforenoted arrangement of the bars 231a, 231b, together with the method of moving the mold 213 between the two stations 211 and 215 in an arc of an approximate extent of a quarter of a circle, has the result that, during the return movement in the direction of the arrow 219 from the removing station 215 towards the extrusion head 211, the bar 231a follows a path 240 which passes beneath the space occupied by the hollow articles 228 suspended from the mandrels 216 inside the removing station 215. Here, again, the hollow articles 228 may remain on the mandrels without interfering with the movement of the mold 213 towards the extrusion head 211 in the direction of the arrow 219.

Also, it is a significant feature here that the path of movement 241 of the upper bar 231b passes beneath the parisons 212, which have meanwhile been extruded in a continuous extrusion process. It is thus seen that in this embodiment the extrusion of the parisons may take place continuously, unlike in the embodiment according to FIGS. 4 to 6. Otherwise, the course of the manufacturing procedure substantially conforms to that of the last named embodiment.

In the embodiment according to FIGS. 7 and 8, the depositing station 236, which is situated after the removing station 215, includes a device 242 for detaching the pieces of waste or flash 243, 244 from the hollow articles 228. This device comprises essentially two rotary impact cutters 245, 246, which are carried by a common support 247, which, in turn, may be reciprocated in the direction of the arrows 248, 249. The upper rotary cutter 245 is associated with the flash 243 on the neck of the bottle and is displaceable along its axis of rotation 250. The lower cutter 246, which is associated with the flash 244 on the bottom of the hollow body 228, is movable transversely of its axis of rotation 251. It is obvious that the knives may be arranged differently, for example, in such a manner that both cutters are displaceable in the direction of their axis of rotation or transversely thereof. The choice of the arrangement will in each case depend on the type and configuration of the flash, the space available, and other factors. The cutters, which are respectively driven by motors 252 and 253, rotate at high speed. During the displacement in the direction of the arrow 248, the knives hit the flash 243 and 244, connected only by a narrow web to the associated hollow article 228, and thus readily separable therefrom upon contact with the respective cutter. On completing the severing operation, the knives return in the direction of the arrow 249 into their initial position shown in FIG. 8.

Figure 9:
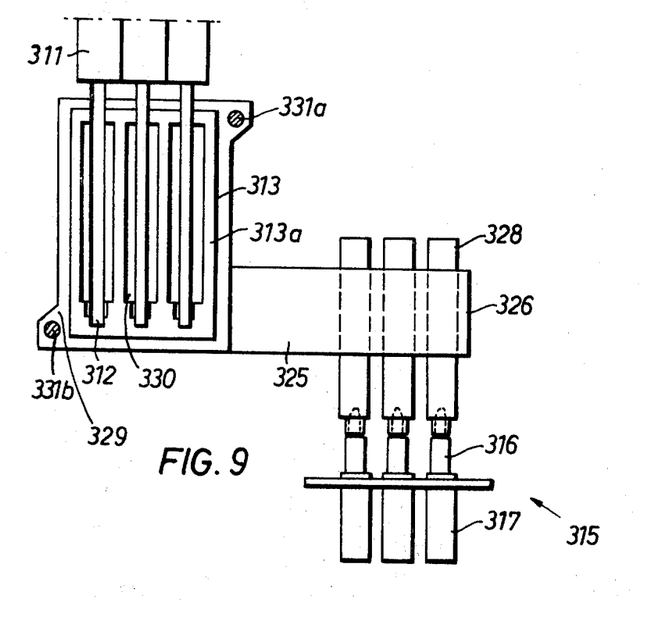
FIGS. 9 and 10 are side elevational views of two working positions of still another embodiment.
Figure 10:
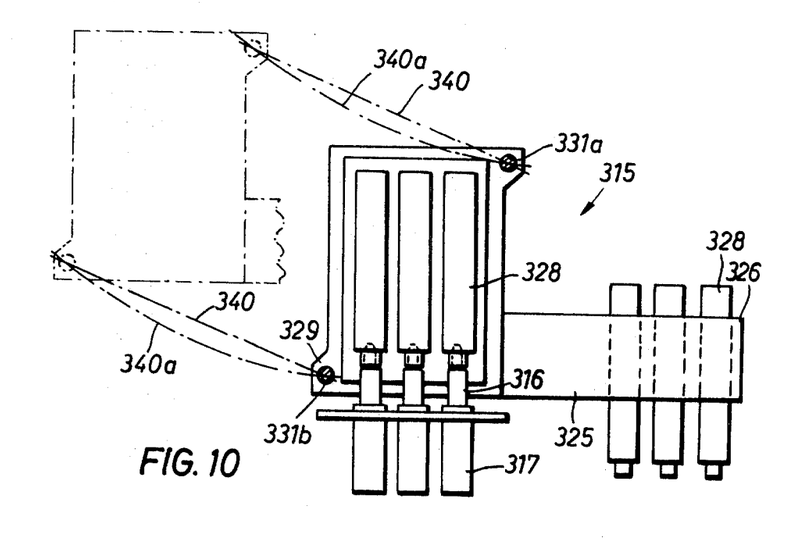

A further embodiment is shown in FIGS. 9 and 10. Here, the blowing and gauging mandrels 316, which are arranged in a removing station 315 and are adapted to be moved vertically up and down by means of cylinders 317, project from below into the mold 313 and into the parisons 312 disposed therein. Accordingly, in order to permit the hollow bodies 328 to remain in the removing station 315 while the mold 313 returns to the extrusion head 311, the bars 331a and 331b are oppositely arranged when compared with previously described embodiments. They are diagonally arranged as before, but here the bar 331a which leads during the displacement in the direction towards the removing station 315, is the upper bar while bar 331b is the lower bar. The result of this arrangement is that, regardless of the type of movement which the mold 313 executes between the two stations, the leading bar 331b, during the return from the removing station 315 to the extrusion read 311, follows a path which is below the space into which the parisons 312 are extruded for the successive cycle. The trailing bar 331a during the return movement from the station 315 to the injection head 311 follows a path which remains above the space occupied by the hollow articles 328 disposed in the removing station 315. It is of no consequence whether this path of movement is linear, as indicated by the broken line 340, or curved, as indicated by the broken line 340a. Even in case of a horizontal movement of the mold 313, the bar 331a will not interfere with the hollow bodies 328 which are still in the removing station 315 and are impaled on mandrels 316. Similarly to the other embodiments, the supports 329 for the mold halves 313a are provided with projections or arms 25, which, at their free ends, form a gripping device 326. The parts in this embodiment cooperate in a manner similar to the previously described structures. The fact that the structure shown in FIGS. 9 and 10 comprises three mold cavities 330 and thus three mandrels 316 is of no significance, since the number of molds and thus the number of simultaneously extruded parisons does not affect the practicing of the invention.

Figure 11:
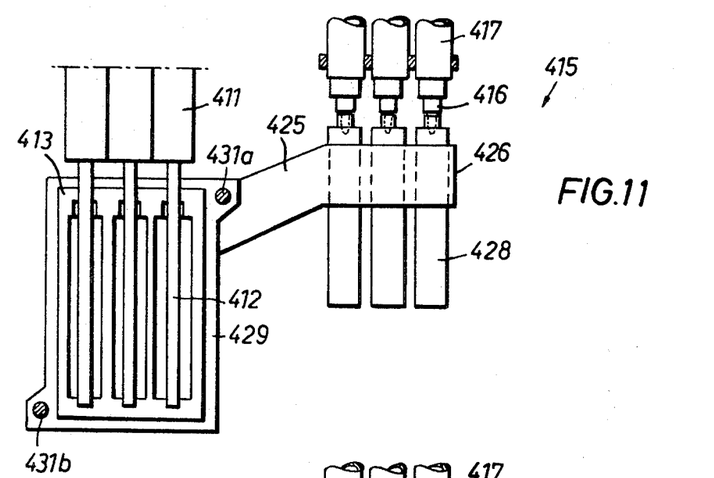
FIGS. 11 and 12 are side elevational views of two working positions of a further embodiment.
Figure 12:
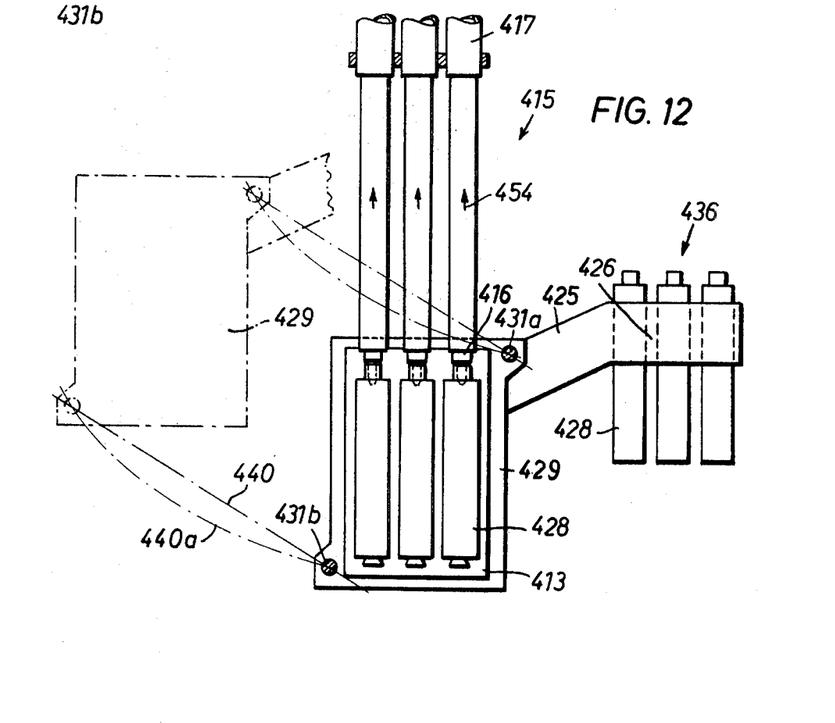

Turning now to the embodiment shown in FIGS. 11 and 12, the structure depicted therein differs from the previously discussed embodiments in that the mandrels 416 arranged in the removing station 415 are displaceable to such an extent that the hollow bodies carried thereby are moved out of the path of travel of the mold 413. In all other significant details this embodiment is identical to the structures already described.

As in the other embodiments, the mandrels 416 are carried by cylinders 417, but are vertically movable to a considerably greater extent. After the mold 413 is opened in the station 415 by moving the two mold halves apart, the mandrels 416, together with bodies 428, are moved upwardly in the direction of the arrows 454 to such an extent that the lowest outer faces of the hollow articles will be disposed above the bar 431a, which is the trailing bar during movement of the mold 413 from the removing station 415 back to the extrusion head 411. It is thus seen that the upper bar 431a may pass unobstructed below the raised bodies 428. The bar 431b, which is the leading bar during this displacement of the mold 413, is also the lower bar, so that a continuous extrusion of the parisons 412 from the extrusion head 414 may take place. Here, again, the displacement of the mold between the two stations may follow a linear or a curved path 440 or 440a, respectively.

It is also possible to arrange the mandrels, similarly to the embodiment of FIGS. 9 and 10, in such a manner that they project from beneath into the mold and into the parisons disposed therein. It is apparent that in such an arrangement the afore-described movement of the mandrels to remove the hollow articles from the path of the mold, would be directed downwardly.

As seen in FIG. 11, the gripper device 426, which is arranged on arms 425 carried by the supports 429, grasps the hollow articles 428 in their raised position which they assumed due to the upward displacement of mandrels 416. After the gripper device 426 is closed in the course of the closing movement of the mold (disposed beneath the extrusion head 411) and thus securely holds the hollow articles 428 still attached to the mandrels 416, the latter may now be withdrawn from the hollow articles 428 with a second and normally shorter upward movement. With a subsequent movement of the mold 413 into the blowing and removing station 415, the gripper device 426, with the hollow articles 428 disposed therein, is brought into the position (depositing station) shown in FIG. 12. There, an additional station 436 may be provided in which any desired finishing operation may be performed on the hollow articles 428.

The afore-described design does not involve a more complex structure or a significant increase in costs. Since the mandrels have to be vertically movable in any case to penetrate into the parison and then withdraw from the blow molded article, merely the path of travel for the mandrels is increased. This embodiment is particularly adapted for use in already existing, subsequently converted machines.

It is seen that the precedingly-described embodiment is designed in such a manner that the displacement of the blow molded article immediately after opening of the mold is effected linearly in its length dimension. It is noted that a displacement in the said direction exerts the least stress—if any at all—on the often still maleable hollow article. This is an advantageous feature since it is often a desideratum to open the mold as soon as possible, thus, at an early moment when the hollow article is not yet completely solidified.

FIGS. 13–17 show another embodiment of the invention, which differs from the previously discussed structures first, by the arrangement of the mandrel and secondly, by the design of the gripper device.

Figure 17:
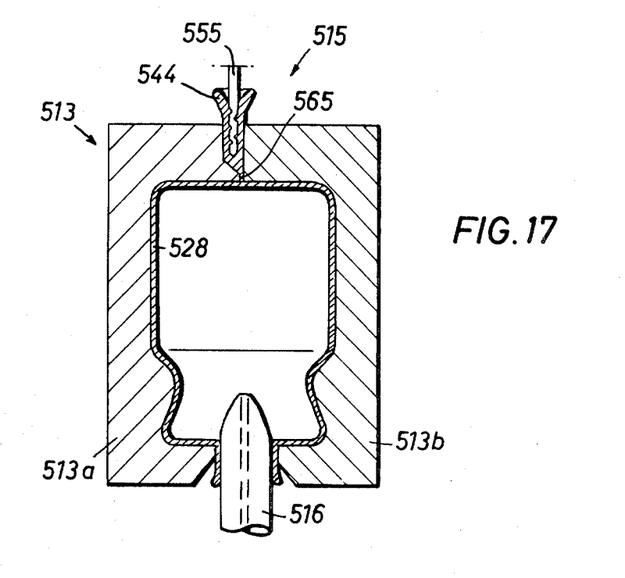
FIG. 17 is an enlarged longitudinal sectional view of a mold of the last-named embodiment.

As seen in FIG. 17, the blowing mandrel 516 projects from below into the mold 513, which, as before, consists of two halves 513a, 513b. Contrary to all other embodiments, however, the mandrel 516 participates in the reciprocating motion of the blow mold 513 between the two stations, that is, between the extruder and the removing station. For this reason it is necessary to provide the removing station with an auxiliary support mandrel 555 (FIGS. 13, 14, 16 and 17) which may be moved up and down longitudinally. In the removing station 515, the auxiliary mandrel 555 assumes the function of holding the hollow article 528 after the mold has been opened, until the gripper device 526 reaches the removing station, closes and thus securely grasps the hollow article carried by the auxiliary mandrel.

Figure 13:
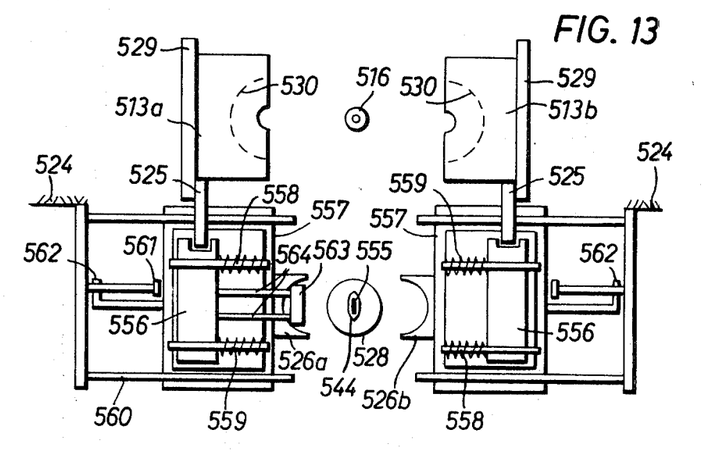
FIGS. 13 to 15 are plan views of still a further embodiment in three working positions.
Figure 14:
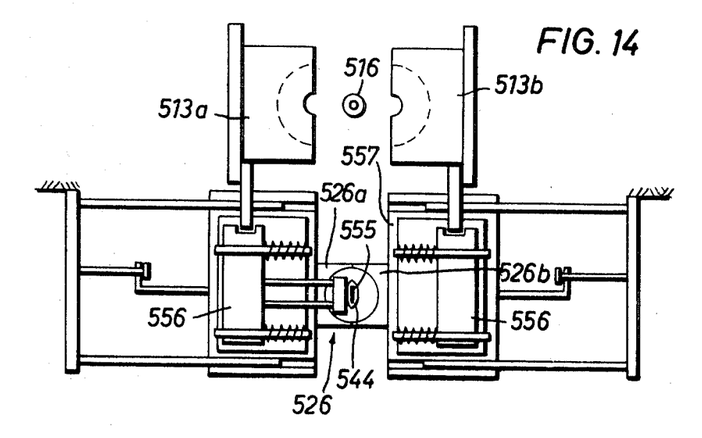
Figure 15:
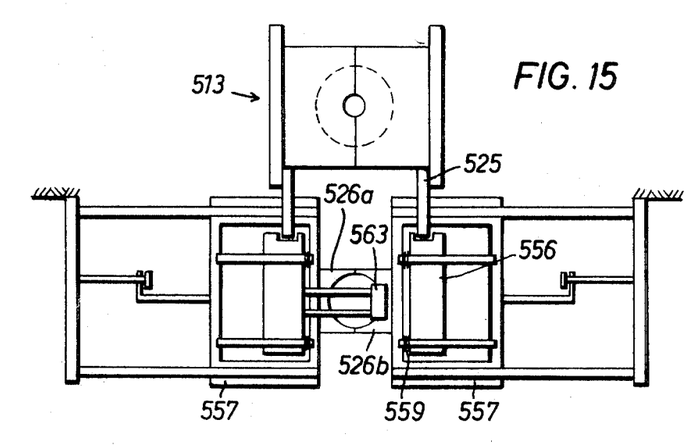
Figure 16:
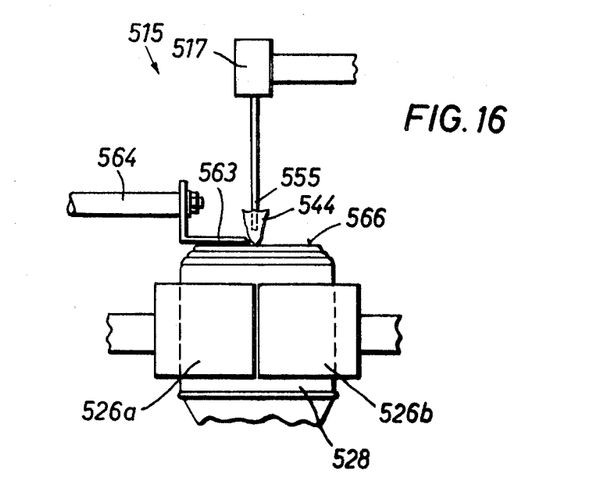
FIG. 16 is an enlarged side elevational view of a detail of FIG. 14.

The two mold halves 513a and 513b, or their supports 529 are provided with arms or projections 525 which, with their free ends, are in engagement with carriages 556 mounted in frame supports 557. The latter also carry grippers 526a, 526b affixed to their sides which face one another. The supports 557 are provided with rods 558 which extend parallel to the opening and closing directions of the mold 513 and of the grippers 526a, 526b and which serves as guide rails for the sliding motion of carriages 556. In each frame support 557, between the carriage 556 and the aforenoted side of support 557 there are disposed helical springs 559 each surrounding a rod 558. The supports 557 are movable in the opening and in the closing direction on guides 560 connected in a suitable manner to the machine frame 524, to which there is also affixed an abutment 561. A nose 562 integral with each support 557 cooperates with the abutment 561 so that the movement of the supports 557 in the closing direction is limited.

The carriage 556 disposed on the left in FIGS. 13 to 15 is provided on its side facing the associated gripper part 526a with a stripper device 563 rigidly attached to carriage 556 by two pins 564.

In the position of the parts as shown in FIGS. 13 to 17, the mold 513 is disposed in the receiving station, i.e. beneath the extrusion head (not shown), and the gripper device 526 is at the removing station, with which the auxiliary mandrel 555 is associated. Since in this embodiment—similar to the embodiment according to FIGS. 1 to 3—only a single article is made during each cycle, the mold 513 has only one mold cavity 530 and also, only one auxiliary mandrel 555 is provided. It is to be understood that if mold 513 has a plurality of mold cavities, then a correspondingly increased number of auxiliary mandrels should be used.

Initially, the mold 513 and the gripper device 526 are completely open (FIG. 13). At this time, a parison extends downwardly from the extrusion head (not shown) and is received by the mold. As soon as the mold 513 reaches the removing station 515, the auxiliary mandrel 555, operable by a cylinder 517, is introduced from above into the flash 544 (FIG. 17). At this time, the flash is still plastically deformable, so that if the auxiliary mandrel 555 has surface irregularities, a positive connection may be established between the auxiliary mandrel 555 and the flash 544, and thus also with the hollow article 528 with which the flash 544 is connected through a thin web 565. Immediately after the forcible insertion of the auxiliary mandrel 555 into the flash 544, the parts assume the position shown in FIG. 17 and the article 528 is formed by blow molding. Thereafter, the mold 513 may be opened which is preferably preceded by the withdrawal of mandrel 516 from the mold and the hollow article 528.

The hollow body 528 disposed in the removing station is now held solely by the auxiliary mandrel 555, since, as already stated, the precedingly withdrawn blowing mandrel 516 participates with the mold 513 in the reciprocating movement between the extrusion head and the removing station.

It is to be noted in this connection that an auxiliary mandrel of the type described above and indicated at 555 may also find application in an apparatus where the blowing mandrel does not travel with the mold. Thus, in assemblies where the blowing mandrel is arranged above the mold, an auxiliary supporting mandrel may be provided which cooperates with the lower portion of the hollow article disposed in the mold.

During the closing movement towards the position shown in FIG. 14, first both the carriages 556 and the supports 557 move synchronously with the two mold halves 513a, 513b. This is achieved by suitably selecting the strength of the springs 559, which are not compressed during this first phase of the closing operation, approximately until the position shown in FIG. 14 is reached. Thus, the displacement of the carriages 556 by the two respective mold halves 513a, 513b also results in a corresponding displacement of the supports 557, which proceeds until the two gripper parts 526a and 526b arrive into engagement with the hollow article 528 disposed in the removing station 515. By this time the mold 513 is still not completely closed (FIG. 14). As the two mold halves 513a, 513b continue to move in the closing direction, the carriages 556 are now caused to slide on rods 558, thus compressing the springs 559. Stated in different terms, each carriage 556 is displaced in relation to the associated support 557 until the terminal position shown in FIG. 15 is reached. The mold 513 is now completely closed. Thus, the mold, immediately after its closing, the position of the gripper parts 526a, 526b has not changed. The force of springs 559 is so chosen that in no case is there a transmission of forces to the hollow body which may cause an unpermitted deformation thereof. Due to advance motion of the gripper parts with respect to the mold halves—which results in a grasping of the hollow article by the gripper device in the removing station prior to the full closing of the mold halves in the receiving station—it is possible to withdraw the blow mandrel from the hollow body or the auxiliary mandrel from the flash before the mold halves are completely closed. Thus, the mold, immediately after its closing, may be moved from the extrusion head of the receiving station towards the removing station.

The stripper 563 secured to the left hand carriage 556 participates in the entire closing movement. Thus, during the second phase, in which the gripper parts 526a, 526b are already in engagement with the hollow article 528, the stripper 563 is displaced in relation to the gripper parts and the hollow article. It is particularly well seen in FIG. 16 that the stripper 563 is moved past the article 528 very close to its base 566 so that the stripper 563, in said second phase, positively abuts the flash 544 and tears it off the base 566 of the hollow article 528. It is noted that the auxiliary mandrel 555 has been introduced into the flash 544 only to such an extent that free passage of the stripper 563 between the base 566 and the lower terminus of auxiliary mandrel 555 is ensured.

Since, as already mentioned, the auxiliary mandrel 555 serves essentially for holding the hollow body 528 after it has been removed from the mold and before it is securely engaged by the gripper device 526, the auxiliary mandrel 555 may already be withdrawn upwardly at the moment in which the parts assume approximately the position according to FIG. 14. As soon as this position is reached, the auxiliary mandrel 555 is no longer required as a holding means for the hollow article 528. Nevertheless, it is generally desirable to retract the auxiliary mandrel 555 upwardly only after completion of the separating operation affecting the flash 544, since the auxiliary mandrel holds the said waste material in a particularly suitable position for the separating operation. In particular, the auxiliary mandrel 555 prevents the flash from being folded over under the action of the stripper 563; this is a distinct possibility if the plastic material is still soft.

It is nevertheless possible to withdraw the auxiliary mandrel 555 before the mold 513 is completely closed. Thus, the mold 513 may be moved from the receiving station into the removing station 515 immediately following the closing operation. Simultaneously, the previously produced hollow article 528, freed from the flash 544 by the stripper 563, is moved, carried by the gripper 526, so that the removing station 515 is empty when the mold 513 returns thereto and assumes a position similar to that shown in FIGS. 3, 4, 8, 10 and 12, with the difference, however, that the blowing mandrel 516 is connected to the mold 513 and projects into the latter from below. Furthermore, this arrangement also provides the possibility of commencing the expanding of the hollow body immediately after closing the mold in the receiving station, so that the station 515 only serves for removing the hollow articles from the mold, whereas in all other embodiments, the removing station also functions as the blowing station.

The gripper device engaging the hollow articles in the removing station is particularly adapted to deliver the hollow articles in an orderly sequence to a subsequent conveyor, while at the same time, the hollow articles may be subjected to any other processing operation.

Figure 18:
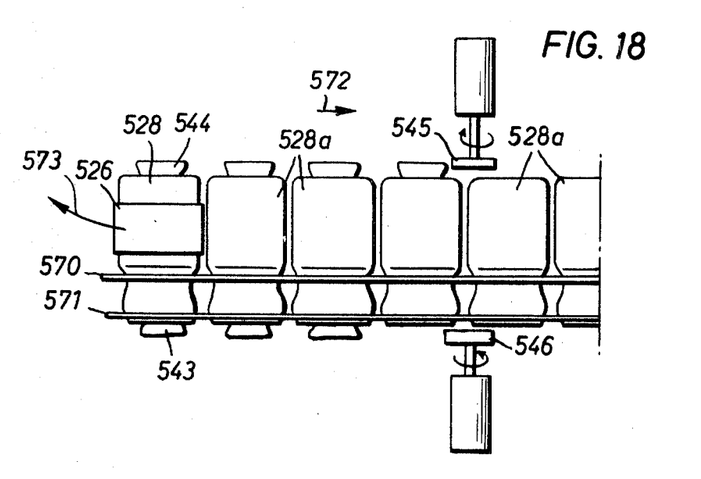
FIG. 18 is a side elevational view of a conveyor for the finished articles.

Turning now to FIG. 18, there is shown a conveyor particularly adapted to be used in the aforenoted environment. The conveyor track comprises a pair of horizontally spaced upper rails 570 and, therebelow, a pair of horizontally spaced lower rails 571. The hollow article 528 engaged by the gripper device 526 is pushed into one end of this track whereby the precedingly inserted hollow articles 528a are intermittently advanced in the direction of the arrow 572.

After the gripper device 526 has pushed the hollow article 528 into the receiving end of the conveyor track, it is opened at the moment when the successive hollow body situated in the removing station is released from the mold. Simultaneously with the subsequent return movement of the mold into the receiving station, the now open gripper device 526 is once again returned in the direction of the arrow 573 into the removing station, where it grasps the successive hollow article in the manner previously described.

The two pieces of flash 543 and 544 on the article are detached during the forward movement of the article in the track by rotating impact cutters 545 and 546 arranged in a stationary manner above and below the conveyor.

In all of the above-described embodiments the working faces of the gripper devices may be provided with a resilient lining (rubber, foam plastic, or the like) to ensure a gentle engagement of the hollow articles.

Summarizing the most significant advantages obtained by the invention, it is seen that individual operation steps may be performed simultaneously without hindrance from one another. In particular, the invention permits, without the least increase in structural costs, a handling of the hollow articles in such a manner that said articles are transmitted to subsequent stations in an orderly sequence and may be submitted to additional treatments without thereby rendering he apparatus or the operation more complex. It is a significant feature that despite a temporary retention of the hollow article in the removing station, the productivity of the apparatus is not decreased.

What we claim is:

1. In an apparatus for blow molding hollow thermoplastic articles, said apparatus being of the known type including (A) a receiving station where parisons are formed, (B) a mold, having at least one cavity, accepting a parison in said receiving station, (C) a blowing mandrel adapted to be introduced in said mold through said parison for expanding the latter by means of pressurized fluid to form a hollow blow molded article, (D) a removing station where said mold is opened to release said blow molded article and (E) means for moving said mold back and forth between said receiving station and said removing station, the improvement comprising,
   (a) a depositing station spaced from said removing station,
   (b) gripper means movable back and forth between said removing station and said depositing station, said gripper adapted to engage a blow molded article in said removing station, to carry said article to said depositing station and to release it there, and
   (c) a support means to which said mold and said gripper means are secured, said support means adapted to assume a first position aligning said mold with said receiving station and simultaneously aligning said gripper means with said removing station, said support means adapted to assume a second position aligning said mold with said removing station and simultaneously aligning said gripper means with said depositing station.

2. An improvement as defined in claim 1, wherein said mold is formed of at least two complemental parts movable towards and away from one another to assume a closed and an open position, respectively; said gripper means is formed of at least two complemental parts movable towards and away from one another to assume a closed and an open position, respectively; means for moving said mold parts with respect to one another simultaneously with and in the same direction as the relative movement between said gripper parts.

3. An improvement as defined in claim 2, wherein said support means is formed of at least two parts each carrying complemental parts of said mold and complemental parts of said gripper means, said support parts are movable towards and away from one another to cause said mold and said gripper means to assume said closed and said open position, respectively; said support parts are movable as a unit back and forth between said first and said second positions.

4. An improvement as defined in claim 3, wherein each of said support parts includes arms holding said gripper parts spaced from said mold parts.

5. An improvement as defined in claim 4, wherein said support means includes
   (a) two aligned frames in which said complemental mold parts are securely held,
   (b) two aligned arms, one secured to and projecting from each frame, said arms, at their end remote from said frame, holding said complemental gripper parts and
   (c) an upper bar and a lower bar interconnecting said frames at diagonally opposed locations and extending substantially normal to the direction of motion of said support means back and forth between said first and second positions; said frames are slidable towards and away from one another on said bars.

6. An improvement as defined in claim 5, wherein said support means is moved back and forth between said first and said second positions in a path which is disposed below said removing station; said upper bar is the leading bar when said mold is moved with said support means from said removing station to said receiving station.

7. An improvement as defined in claim 5, wherein said support means is moved back and forth between said first and said second positions in a path which is disposed above said removing station; said lower bar is the leading bar when said mold is moved with said support means from said removing station to said receiving station.

8. An improvement as defined in claim 1, where said support means is moved back and forth between said first and said second positions in a linear path.

9. An improvement as defined in claim 1, wherein said support means is moved back and forth between said first and said second positions in a curved path.

10. An improvement as defined in claim 9, wherein said curved path lies in a vertical plane along an arc of a ¼ circle.

11. An improvement as defined in claim 3, wherein in each support part the complemental mold parts are movable with respect to the complemental gripper parts in a direction coinciding with the direction of movement of said support parts with respect to one another; resilient means interposed between a mold part and a gripper part to oppose a movement towards one another.

12. An improvement as defined in claim 11, wherein said support means includes
   (A) two frames to which said complemental gripper parts are fixedly attached,
   (B) a carriage disposed in each frame and adapted to move with respect to its associated frame in a direction coinciding with the direction of movement of said frames relative to one another,
   (C) spring means forming said resilient means opposing the movement of said carriages towards one another,
   (D) means connecting said complemental mold parts with each carriage to be carried thereby as a unit; when said frames are moved towards one another in said first position, said gripper is adapted to close about said blow molded article in said removing station before said mold is closed in said receiving station; after said gripper is closed, said carriages are adapted to be moved towards one another against the force of said spring means until said mold is closed.

13. An improvement as defined in claim 12, wherein to one of said carriages there is fixedly attached a stripper means adapted to remove the flash from said blow molded article subsequent to the engagement of the latter by said gripper.

14. An improvement as defined in claim 1, wherein said blowing mandrel is adapted to support said blow molded article in said removing station after opening of said mold.

15. An improvement as defined in claim 14, wherein said blowing mandrel is adapted to be longitudinally displaced together with said blow molded article supported thereby to move the latter out of the path of travel of said support means from said second position into said first position.

16. An improvement as defined in claim 1, including an auxiliary support mandrel adapted to support said blow molded article when said mold is opened in said removing station.

17. An improvement as defined in claim 16, wherein said auxiliary support mandrel is provided with surface irregularities to ensure a firm attachment to said blow molded article.

18. An improvement as defined in claim 13, including an auxiliary support mandrel adapted to be introduced into said flash when said blow molded article is engaged by said gripper in said removing station, said stripper is adapted to pass between a terminal face of said blow molded article and the terminus of said auxiliary support mandrel.

19. An improvement as defined in claim 1, including a device in said depositing station for detaching flash from said blow molded article as it arrives, carried by said gripper, into said last named station.

20. An improvement as defined in claim 119, wherein said device is provided with at least one rotary impact cutter.

21. An improvement as defined in claim 1, including a conveyor means extending from said depositing station to receive said blow molded articles released by said gripper in said last named station.

22. An improvement as defined in claim 21, wherein said conveyor means is associated with a device for detaching flash from the blow molded articles as the latter are advanced in said conveyor means.

23. An improvement as defined in claim 21, wherein the advance of the blow molded articles in said conveyor is intermittent and is caused by said gripper sequentially introducing and then releasing blow molded articles at the beginning of said conveyor means.

24. An improvement as defined in claim 1, wherein said gripper is designed as a cooling means for the blow molded article it engages.

References Cited
UNITED STATES PATENTS

| | | | |
|---|---|---|---|
| 3,235,907 | 2/1966 | Harwood et al. | 18—5 |
| 2,465,073 | 9/1969 | Fogelberg et al. | 18—15X |

FOREIGN PATENTS

| | | |
|---|---|---|
| 1,517,709 | | France. |

H. A. KILBY, JR., Primary Examiner